(12) United States Patent
Crowther et al.

(10) Patent No.: US 7,541,413 B2
(45) Date of Patent: Jun. 2, 2009

(54) OLEFIN POLYMERIZATION CATALYSTS, THEIR SYNTHESIS AND USE

(75) Inventors: Donna J. Crowther, Seabrook, TX (US); Celestino M. Perez, Pasadena, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 11/866,113

(22) Filed: Oct. 2, 2007

(65) Prior Publication Data

US 2009/0088542 A1 Apr. 2, 2009

(51) Int. Cl.
*C08F 4/02* (2006.01)
*C08F 4/80* (2006.01)

(52) U.S. Cl. .............. 526/171; 526/172; 526/161; 526/348; 502/152; 502/155; 502/167; 502/132; 502/87

(58) Field of Classification Search .......... 526/348, 526/161, 171, 172; 502/152, 155, 167, 87, 502/132
See application file for complete search history.

(56) References Cited

U.S. PATENT DOCUMENTS 6,451,939 B1 * 9/2002 Britovsek et al. .......... 526/161

2003/0104929 A1 * 6/2003 McTavish et al. .......... 502/150

FOREIGN PATENT DOCUMENTS

| EP | 1 099 714 | | 5/2001 |
| EP | 1 099 714 A1 | * | 5/2001 |
| EP | 1 125 928 | | 8/2001 |

OTHER PUBLICATIONS

"Highly Active Iron and Cobalt Catalysts for the Polymerization of Ethylene", B.L. Small et al., *J. Am. Chem.Soc.* 120 (1998), pp. 4049-4050.
"Novel olefin polymerization catalysts based on iron and cobalt", G.J.P. Britovsek et al., *Chem. Commun.* (1998), pp. 849-850.
"Ethylene polymerization with Silica-supported bis(imino)pyridyl iron (II) catalysts", *Journal of Catalysis*, 234 (2005), pp. 101-110, Zheng et al.
Immobilization and activation of 2,6-bis(imino)pyridyl Fe, Cr and V precatalysts using a $MgCl_2/AlR_n(OEt)_{3-n}$ support: Effects on polyethylene molecular weight and molecular weight distribution, *Journal of Molecular Catalysis A: Chemical*, 260 (2006), pp. 135-143, Huang et al.
"Preparation of Spherical $MgCl_2$-Supported Late-Transition Metal Catalysts for Ethylene Polymerization", *Macromol. Chem. Phys.*, 207, (2006), pp. 779-786, Xu et al.
"Iron Catalyzed Polyethylene Chain Growth on Zinc: A Study of the Factors Delineating Chain Transfer versus Catalyzed Chain Growth in Zinc and Related metal Alkyl Systems", *J. Am. Chem. Soc.* 126 (34), 2004, pp. 10701-10712.

* cited by examiner

*Primary Examiner*—Ling-Siu Choi

(57) ABSTRACT

A catalyst system for the polymerization or copolymerization of α-olefins comprises a bis(imino)pyridyl complex of a transition metal on a support having an aluminum halide and/or an alkylaluminum halide chemically or physically bonded thereto.

42 Claims, No Drawings

OLEFIN POLYMERIZATION CATALYSTS, THEIR SYNTHESIS AND USE

FIELD OF THE INVENTION

This invention relates to olefin polymerization catalysts, their synthesis and use.

BACKGROUND OF THE INVENTION

A large variety of processes and catalysts exist for the homopolymerization or copolymerization of olefins. For some applications, it is desirable for the polyolefin product to have a low weight average molecular weight (less than 50,000 g/mol) combined with a relatively narrow and controllable molecular weight distribution, since such polymers can be blended with higher molecular weight LLDPE containing hexane or other comonomers to produce blends with enhanced impact strength, high environmental stress crack resistance and good processing characteristics.

Traditional Ziegler-Natta catalysts systems comprise a transition metal compound co-catalyzed by an aluminum alkyl but typically produce polyolefins of high molecular weight, generally with a relatively broad molecular weight distribution.

More recently metallocene catalyst systems have been developed wherein the transition metal compound has one or more cyclopentadienyl, indenyl or fluorenyl ring ligands (typically two). Metallocene catalyst systems, when activated with cocatalysts, such as alumoxane, are effective to polymerize monomers to polyolefins having a wide range of average molecular weights and a narrow molecular weight distribution. However, the target weight average molecular weights for gas phase or solution polymerization using metallocene catalyst are generally in the range of 80,000 to 120,000 g/mol. Moreover, metallocene catalysts frequently suffer from a number of disadvantages, for example, high sensitivity to impurities when used with commercially available monomers, diluents and process gas streams, the need to use large quantities of expensive alumoxanes to achieve high activity, and difficulties in putting the catalyst on to a suitable support.

There is therefore significant interest in developing new catalyst systems for the homopolymerization or copolymerization of olefins.

In 1998 two separate groups working independently reported that bis(imino)pyridyl iron complexes of the type $\{2,6\text{-}[ArN=C(Me)]_2C_5H_3N\}FeCl_2$ can be activated with methylalumoxane (MAO) to produce highly active catalysts for ethylene polymerization. See B. L. Small et al., *J. Am. Chem. Soc.* 120 (1998), 4049 and G. J. P. Britovsek et al., *Chem. Commun.* (1998), 849.

U.S. Pat. No. 6,451,939 discloses catalyst systems for the polymerization or copolymerization of 1-olefins which contain nitrogen-containing transition metal compounds comprising the skeletal unit depicted in the following formula:

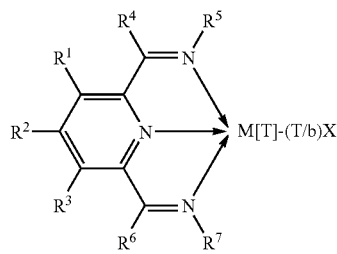

wherein M is Fe[II] Fe[III], Co[I], Co[II], Co[III], Mn[I], Mn[II], Mn[III], Mn[IV], Ru[II], Ru[III] or Ru[IV]; X is an atom or group covalently or ionically bonded to the transition metal M; T is the oxidation state of the transition metal M and b is the valency of the atom or group X; and $R^1$ to $R^7$ are independently selected from hydrogen, halogen, hydrocarbyl, substituted hydrocarbyl, heterohydrocarbyl or substituted heterohydrocarbyl. The transition metal compound of this formula can be unsupported or supported on a support material, for example, silica, alumina, or zirconia, or on a polymer or prepolymer, for example polyethylene, polystyrene, or poly(aminostyrene).

In addition, U.S. Patent Application Publication No. 2003/0104929 (equivalent to WO 01/23396) discloses a nitrogen containing transition metal complex having formula:

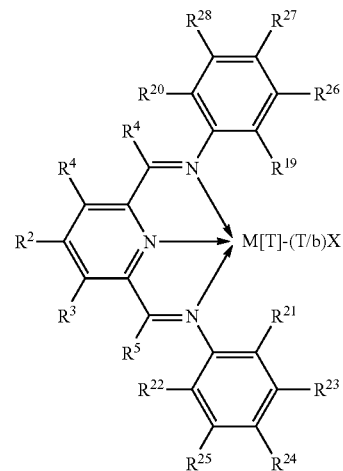

wherein M is Fe[II], Fe[III], Co[I], Co[II], Co[III], Mn[I], Mn[II], Mn[III], Mn[IV], Ru[II], Ru[III] or Ru[IV]; X represents an atom or group bonded to the transition metal M; T is the oxidation state of the transition metal M and b is the valency of the atom or group X; $R^1$, $R^2$, $R^3$, $R^4$, $R^5$, $R^{19}$, $R^{20}$, $R^{21}$, $R^{22}$, $R^{23}$, $R^{24}$, $R^{25}$, $R^{24}$, $R^{26}$ and $R^{28}$ are independently selected from hydrogen, halogen, hydrocarbyl, substituted hydrocarbyl, heterohydrocarbyl or substituted heterohydrocarbyl; provided that when any two or more of $R^1$, $R^2$, $R^3$, $R^4$, and $R^5$ are hydrocarbyl, substituted hydrocarbyl, heterohydrocarbyl or substituted heterohydrocarbyl, two or more can be linked to form one or more cyclic substituents, and at least one of $R^4$ and $R^5$ is a hydrocarbyl group having at least two carbon atoms. The transition metal complex of this formula can be unsupported or supported on a support material, for example, silica, alumina, $MgCl_2$ or zirconia, or on a polymer or prepolymer, for example polyethylene, polypropylene, polystyrene, or poly(aminostyrene), and can be used in an olefin polymerization catalyst system.

Although bis(imino)pyridyl transition metal complexes have been shown to be highly active ethylene polymerization catalysts when activated with MAO or even some aluminum alkyl co-catalysts, they produce polyethylene with a broad molecular weight distribution when run as a homogeneous (unsupported) system. Moreover, most attempts to employ supported bis(imino)pyridyl transition metal complexes have only resulted in further broadening of the polymer molecular weight distribution. There is therefore a need to develop catalysts systems which contain supported bis(imino)pyridyl transition metal complexes and which are effective in producing polyolefins with a narrower molecular weight distribution.

In *Journal of Catalysis,* 234 (2005), 101-110, Zheng et al. report that the modification of bis(imino)pyridyl ligands by the introduction of reactive ethoxysilane or Si—Cl end groups, allows the ligands to be immobilized on silica by direction reaction of the ethoxysilane or Si—Cl groups with silanol groups on the silica surface. Complexation of the supported ligands with $FeCl_2.4H_2O$ is said to produce silica-supported Fe(II) precatalysts, which exhibit high activity for ethylene polymerization in the presence of modified methylalumoxane (MMAO). In one case, using the precatalyst obtained from the ethoxysilane-modified bis(imino)pyridyl ligands, polymerization produced polyethylene having a weight-averaged molecular weight of $50.1 \times 10^4$ g/mol and a unimodal molecular weight distribution with a relatively high polydispersity index of 9.7.

In *Journal of Molecular Catalysis A: Chemical,* 260 (2006), 135-143, Huang et al. report that ethylene polymerizations carried out with various bis(imino)pyridyl iron, chromium and vanadium complexes immobilized on a support of the type $MgCl_2/AlR_n(OR)_{3-n}$ gave polyethylene of relatively broad molecular weight distribution, but high molecular weight, in the case of the iron complex, but gave a very narrow molecular weight distribution in the case of the vanadium complex.

In *Macromol. Chem. Phys.,* 207, (2006), 779-786, Xu et al. report that spherical $MgCl_2$ supports obtained by the thermal dealcoholization of $MgCl_2.2.56C_2H_5OH$ at 170° C. for 4 hours are effective for immobilizing bis(imino)pyridyl $Fe^{II}$ and $Ni^{II}$ complexes. When the resultant nickel complexes were used to polymerize ethylene in the presence of triisobutylaluminum as activator, the polyethylene products exhibited a weight-averaged molecular weight between 44 and $90 \times 10^4$ g/mol and a molecular weight distribution between 2.35 and 2.87. In the case of the iron complexes, ethylene polymerization in the presence of triethylaluminum as activator produced polyethylene products exhibiting a weight-averaged molecular weight between 49 and $61 \times 10^4$ g/mol and a molecular weight distribution between 11.7 and 20.

It has now been found that supports, such as silica, having an aluminum halide and/or an alkylaluminum halide chemically or physically bonded thereto are effective in immobilizing bis(imino)pyridyl transition metal complexes and that the resultant supported complexes, when combined with an activator, such as a perfluorinatedaryl borate, and optionally an trialkylaluminum co-catalyst, are effective in polymerizing α-olefins, such as ethylene. In particular, with suitable selection of the ligand structure of the complex, the supported catalysts can be used to produce polymers of low weight average molecular weight combined with a relatively narrow molecular weight distribution.

SUMMARY OF THE INVENTION

According to one aspect, the present invention relates to a catalyst system for the polymerization or copolymerization of α-olefins, the catalyst system comprising a bis(imino)pyridyl complex of a transition metal immobilized on a support having an aluminum halide and/or an alkylaluminum halide chemically or physically bonded thereto.

In one embodiment, the support has surface hydroxyl groups which have been chemically reacted with said aluminum halide and/or alkylaluminum. Conveniently, the support comprises silica or alumina.

Conveniently, the alkylaluminum halide has the formula $AlX_2R$ or $AlXR_2$ where X is a halide group and R is an alkyl group having from about 1 to about 8 carbon atoms, such as diethylaluminum chloride.

In one embodiment, the bis(imino)pyridyl complex is represented by the following formula (I):

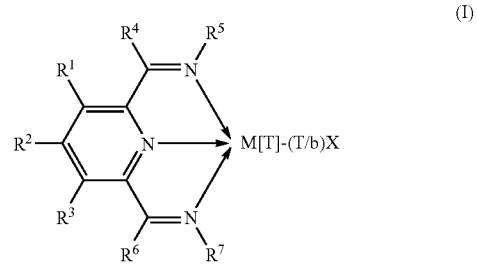

wherein M comprises a transition metal from Groups 7 to 9 of the Periodic Table of Elements, such as Fe[II] Fe[III], Co[I], Co[II], Co[III], Mn[I], Mn[II], Mn[III], Mn[IV], Ru[II], Ru[III] or Ru[IV]; X is an atom or group covalently or ionically bonded to the transition metal M; T is the oxidation state of the transition metal M and b is the valency of the atom or group X; and $R^1$ to $R^7$ are independently selected from hydrogen, halogen, hydrocarbyl, and substituted hydrocarbyl, provided that when any two or more of $R^1$ to $R^7$ are hydrocarbyl or substituted hydrocarbyl, two or more can be linked to form one or more cyclic substituents.

In another embodiment, the bis(imino)pyridyl complex is represented by the following formula (II):

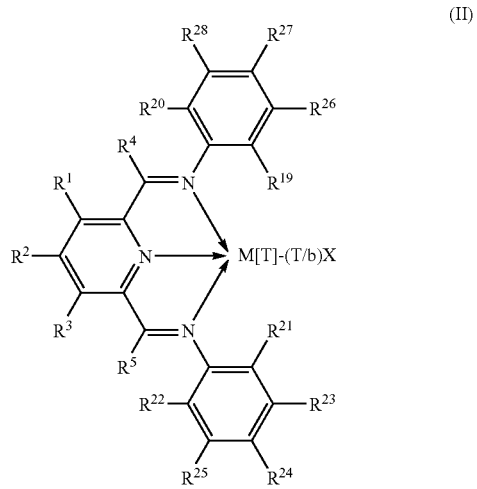

wherein M comprises a transition metal from Groups 7 to 9 of the Periodic Table of Elements, such as Fe[II], Fe[III], Co[I], Co[II], Co[III], Mn[I], Mn[II], Mn[III], Mn[IV], Ru[II], Ru[III] or Ru[IV]; X represents an atom or group bonded to the transition metal M; T is the oxidation state of the transition metal M and b is the valency of the atom or group X; $R^1$, $R^2$, $R^3$, $R^4$, $R^5$, $R^{19}$, $R^{20}$, $R^{21}$, $R^{22}$, $R^{23}$, $R^{24}$, $R^{25}$, $R^{24}$, $R^{27}$ and $R^{28}$ are independently selected from hydrogen, halogen, hydrocarbyl, and substituted hydrocarbyl, provided that when any two or more of $R^1$, $R^2$, $R^3$, $R^4$ and $R^5$ are hydrocarbyl or substituted hydrocarbyl, two or more can be linked to form one or more cyclic substituents.

Conveniently, M comprises Fe[II], X comprises a halide, especially chloride, $R^1$, $R^2$, $R^3$, $R^{23}$, $R^{24}$, $R^{25}$, $R^{26}$, $R^{27}$ and $R^{28}$ are hydrogen, $R^4$ and $R^5$ are alkyl, especially methyl, and $R^{19}$, $R^{20}$, $R^{21}$ and $R^{22}$ are independently selected from hydrogen, alkyl, especially methyl, and aryl, especially tolyl.

Conveniently, the catalyst system also comprises at least one activator, such as a perfluorinated aryl borate.

According to a further aspect, the present invention relates to a method of producing a catalyst system for the polymerization or copolymerization of olefins, the method comprising:

(a) treating a support with an aluminum halide or an alkylaluminum halide to produce an aluminum-treated support;

(b) reacting the aluminum-treated support with a bis(imino)pyridyl complex of a transition metal; and (c) reacting the aluminum-treated support with a perfluorinated aryl borate.

Conveniently, the reacting (c) is effected after the reacting (b), but alternatively the reacting (c) can be effected before the reacting (b).

In yet a further aspect, the present invention relates to a process for polymerizing or copolymerizing at least one α-olefin, especially ethylene, the process comprising contacting said at least one α-olefin under polymerization conditions with a catalyst system comprising (a) a bis(imino)pyridyl complex of a transition metal immobilized on a support having an aluminum halide and/or an alkylaluminum halide chemically or physically bonded thereto and (b) at least one activator.

DETAILED DESCRIPTION OF THE INVENTION

As used herein, the new numbering scheme for the Periodic Table of Elements is used as published in CHEMICAL AND ENGINEERING NEWS 1985, 63(5), 27.

The terms "independently represent" and "independently selected from" are used herein to indicate that the designated groups, e.g., $R_1$ and $R_3$, can be identical or different.

As used herein, the term "catalyst system" is intended to refer to a composition that is capable of and used to initiate polymerization. Thus, the term "catalyst system" may include the transition metal ligand complex of the invention alone or the combination of transition metal ligand complex and an activator. In this respect, the term "activator" is used to mean a compound that increases the rate at which the transition metal ligand complex polymerizes olefin monomers and/or a compound that affects the molecular weight, degree of branching, comonomer content, or other properties of the resultant polymer. The catalyst system of the invention may also include other components, such as a support.

The terms "hydrocarbyl", "hydrocarbyl radical" and "hydrocarbyl group" are used interchangeably throughout this document. Likewise the terms "group," "radical," and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic.

Substituted hydrocarbyl radicals are radicals in which at least one hydrogen atom has been substituted with at least one functional group such as halogen (e.g. F, Cl, Br, I), halogen-containing group (e.g. $CF_3$), $NH_2$, $NR*_2$, OH, OR*, SeR*, TeR*, $PR*_2$, $AsR*_2$, $SbR*_2$, SR*, $BR*_2$, $SiR*_3$, $GeR*_3$, $SnR*_3$, $PbR*_3$ and the like or where at least one non-hydrocarbon atom or group has been inserted within the hydrocarbyl radical, such as —O—, —S—, —Se—, —Te—, —N(R*)—, =N—, —P(R*)—, =P—, —As(R*)—, =As—, —Sb(R*)—, =Sb—, —B(R*)—, =B—, —Si(R*)$_2$—, —Ge(R*)$_2$—, —Sn(R*)$_2$—, —Pb(R*)$_2$— and the like, where R* is independently a hydrocarbyl or halocarbyl radical, and two or more R* may join together to form a substituted or unsubstituted saturated, partially unsaturated or aromatic cyclic or polycyclic ring structure.

The term "aryl" is used herein to refer to an aromatic substituent which may be a single aromatic ring or multiple aromatic rings which are fused together or linked covalently. The aromatic ring(s) may include phenyl, naphthyl, anthracenyl, and biphenyl. The term "aryl" is also used herein to include "substituted aryl" in which one or more hydrogen atoms attached to any carbon atom on an aromatic ring is replaced by one or more groups, such as alkyl or cycloalkyl.

The present disclosure is directed to a catalyst system for the polymerization or copolymerization of α-olefins, especially ethylene, wherein the catalyst system comprises a bis(imino)pyridyl complex of a transition metal on a support having an aluminum halide and/or an alkylaluminum halide chemically or physically bonded thereto. Also described are methods of producing the catalyst system and use of the catalyst system in the polymerization and copolymerization of α-olefins.

Bis(imino)pyridyl Complex

The bis(imino)pyridyl complex employed in the present catalyst system is represented by the following formula (I):

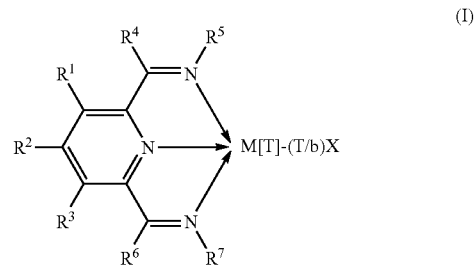

(I)

wherein M comprises a transition metal from Group 7, 8, or 9 of the Periodic Table of Elements, such as Fe[II] Fe[III], Co[I], Co[II], Co[III], Mn[I], Mn[II], Mn[III], Mn[IV], Ru[II], Ru[III] or Ru[IV]; X is an atom or group covalently or ionically bonded to the transition metal M; T is the oxidation state of the transition metal M and b is the valency of the atom or group X; and $R^1$, $R^2$, $R^3$, $R^4$, $R^5$, $R^6$, and $R^7$ are independently selected from hydrogen, halogen, hydrocarbyl, and substituted hydrocarbyl, provided that when any two or more of $R^1$ to $R^7$ are hydrocarbyl or substituted hydrocarbyl, two or more can be linked to form one or more cyclic substituents.

In one embodiment, bis(imino)pyridyl complex employed herein is represented by the formula (II):

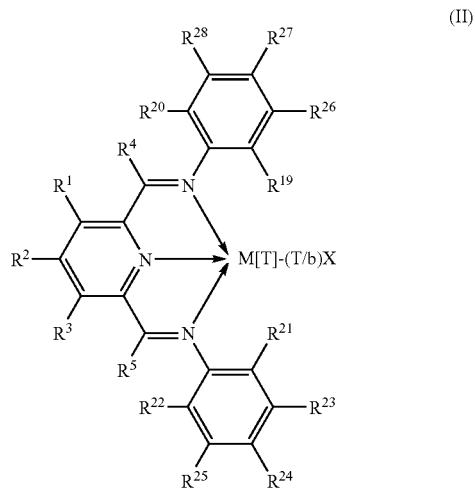

(II)

wherein M, X, T and b are the same as for formula (I); and $R^1$, $R^2$, $R^3$, $R^4$, $R^5$, $R^{19}$, $R^{20}$, $R^{21}$, $R^{22}$, $R^{23}$, $R^{24}$, $R^{25}$, $R^{26}$, $R^{27}$ and $R^{28}$ are independently selected from hydrogen, halogen, hydrocarbyl, substituted hydrocarbyl, heterohydrocarbyl or substituted heterohydrocarbyl; provided that when any two or more of $R^1$, $R^2$, $R^3$, $R^4$, and $R^5$ are hydrocarbyl, substituted hydrocarbyl, heterohydrocarbyl or substituted heterohydrocarbyl, two or more can be linked to form one or more cyclic substituents.

Conveniently, M comprises Fe[II], X comprises a halide, especially chloride, $R^1$, $R^2$, $R^3$, $R^{23}$, $R^{24}$, $R^{25}$, $R^{26}$, $R^{27}$ and $R^{28}$ are hydrogen and $R^4$ and $R^5$ are alkyl, especially methyl, and $R^{19}$, $R^{20}$, $R^{21}$ and $R^{22}$ are independently selected from hydrogen, alkyl, especially methyl, and aryl, especially tolyl.

Examples of suitable complexes within the above general formulae include 2,6 bis[1-(2,6-dimethylphenylimine)ethyl] pyridine iron dichloride and 2,6 bis[1-(2-tolylphenylimine) ethyl]pyridine iron dichloride.

Bis(imino)pyridyl ligands of the type illustrated in formulae (I) and (II) can generally be prepared by condensation reactions between bis(carbonyl)pyridine compounds and appropriate amines or hydrazines. Such reactions can be catalysed, for example, by acids, for example, acetic acid or toluene-p-sulphonic acid. During reactions of this type it is normally advantageous to remove from the reaction zone the water eliminated by the reaction of the carbonyl groups with the $—NH_2$ groups. In the preparation of ligands using this type of reaction, it is preferred to take off the water by refluxing the reaction mixture with an azeotrope-forming water-immiscible liquid, and separating and removing the water from the distillate in a suitable reflux head, for example in a Dean and Stark head. Suitable liquids for this purpose are, for example, hydrocarbons, especially aromatic hydrocarbons such as toluene or xylene. The final metal complex can then be produced by reacting the resultant bis(imino)pyridyl compound with a solution of the metal salt, for example $FeCl_2$, in an organic solvent, such as butanol.

Activators and Catalyst Activation

The bis(imino)pyridyl compounds described are useful as catalyst precursors and, when activated with conventional activators, form active catalysts for the polymerization or oligomerization of olefins. Activators that may be used include Lewis acid activators, such as triphenyl boron, tris-perfluorophenyl boron, tris-perfluorophenyl aluminum and the like; and ionic activators, such as dimethylanilinium tetrakis perfluorophenyl borate, triphenyl carbonium tetrakis perfluorophenyl borate, dimethylanilinium tetrakis perfluorophenyl aluminate, and the like.

Compounds useful as an ionic activator component generally comprise a cation, which is preferably a Bronsted acid capable of donating a proton, and a compatible non-coordinating anion which anion is relatively large (bulky), capable of stabilizing the active catalyst species which is formed when the two compounds are combined and sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In one embodiment, suitable ionic activators may be represented by the following formula: $(L^{}—H)_d^+(A^{d-})$ wherein $L^{}$ is an neutral Lewis base; H is hydrogen; $(L^{**}—H)$ is a Bronsted acid $A^{d-}$ is a non-coordinating anion having the charge $d^-$, d is an integer from 1 to 3.

The cation component, $(L^{}—H)_d^+$ may include Bronsted acids such as protons or protonated Lewis bases or reducible Lewis acids capable of protonating or abstracting a moiety, such as an alkyl or aryl, from the precatalyst after alkylation. Suitable cation components $(L^{}—H)_d^+$ include ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiums from ethers such as dimethyl ether, diethyl ether, tetrahydrofuran and dioxane, sulfoniums from thioethers, such as diethyl thioethers and tetrahydrothiophene, and mixtures thereof. The activating cation $(L^{**}—H)_d^+$ may also be a moiety such as silver, tropylium, carbeniums, ferroceniums and mixtures, preferably carboniums and ferroceniums; most preferably triphenyl carbonium.

The anion component $A^{d-}$ include those having the formula $[M^{k+}Q^n]^{d-}$ wherein k is an integer from 1 to 3; n is an integer from 2-6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than one occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Illustrative, but not limiting examples of boron compounds which may be used as an activating cocatalyst in combination with a co-activator in the preparation of the improved catalysts of this invention are tri-substituted ammonium salts such as:

trimethylammonium tetraphenylborate, triethylammonium tetraphenylborate, tripropylammonium tetraphenylborate, tri (n-butyl)ammonium tetraphenylborate, tri(tert-butyl)ammonium tetraphenylborate, N,N-dimethylanilinium tetraphenylborate, N,N-diethylanilinium tetraphenylborate, N,N-dimethyl-(2,4,6-trimethylanilinium)tetraphenylborate, trimethylammonium tetrakis(pentafluorophenyl)borate, triethylammonium tetrakis(pentafluorophenyl)borate, tripropylammonium tetrakis(pentafluorophenyl)borate, tri(n-butyl)ammonium tetrakis(pentafluorophenyl)borate, tri(sec-butyl)ammonium tetrakis(pentafluorophenyl)borate, N,N-dimethylanilinium tetrakis(pentafluorophenyl)borate, N,N-diethylanilinium tetrakis(pentafluorophenyl)borate, N,N-dimethyl-(2,4,6-trimethylanilinium)tetrakis (pentafluorophenyl)borate, trimethylammonium tetrakis-(2, 3,4,6-tetrafluorophenyl)borate, triethylammonium tetrakis-(2,3,4,6-tetrafluorophenyl)borate, tripropylammonium tetrakis-(2,3,4,6-tetrafluorophenyl)borate, tri(n-butyl)ammonium tetrakis-(2,3,4,6-tetrafluorophenyl)borate, dimethyl (tert-butyl)ammonium tetrakis-(2,3,4,6-tetrafluorophenyl) borate, N,N-dimethylanilinium tetrakis-(2,3,4,6-tetrafluorophenyl)borate, N,N-diethylanilinium tetrakis-(2,3, 4,6-tetrafluorophenyl)borate, N,N-dimethyl-(2,4,6-trimethylanilinium)tetrakis-(2,3,4,6-tetrafluorophenyl) borate, trimethylammonium tetrakis(perfluoronaphthyl) borate, triethylammonium tetrakis(perfluoronaphthyl) borate, tripropylammonium tetrakis(perfluoronaphthyl) borate, tri(n-butyl)ammonium tetrakis(perfluoronaphthyl)

borate, tri(tert-butyl)ammonium tetrakis(perfluoronaphthyl) borate, N,N-dimethylanilinium tetrakis(perfluoronaphthyl) borate, N,N-diethylanilinium tetrakis(perfluoronaphthyl) borate, N,N-dimethyl-(2,4,6-trimethylanilinium)tetrakis (perfluoronaphthyl)borate, trimethylammonium tetrakis (perfluorobiphenyl)borate, triethylammonium tetrakis (perfluorobiphenyl)borate, tripropylammonium tetrakis (perfluorobiphenyl)borate, tri(n-butyl)ammonium tetrakis (perfluorobiphenyl)borate, tri(tert-butyl)ammonium tetrakis (perfluorobiphenyl)borate, N,N-dimethylanilinium tetrakis (perfluorobiphenyl)borate, N,N-diethylanilinium tetrakis (perfluorobiphenyl)borate, N,N-dimethyl-(2,4,6-trimethylanilinium)tetrakis(perfluorobiphenyl)borate, trimethylammonium tetrakis(3,5-bis(trifluoromethyl)phenyl)borate, triethylammonium tetrakis(3,5-bis(trifluoromethyl)phenyl)borate, tripropylammonium tetrakis(3,5-bis(trifluoromethyl)phenyl)borate, tri(n-butyl)ammonium tetrakis(3,5-bis(trifluoromethyl)phenyl)borate, tri(tert-butyl) ammonium tetrakis(3,5-bis(trifluoromethyl)phenyl)borate, N,N-dimethylanilinium tetrakis(3,5-bis(trifluoromethyl) phenyl)borate, N,N-diethylanilinium tetrakis(3,5-bis(trifluoromethyl)phenyl)borate, N,N-dimethyl-(2,4,6-trimethylanilinium)tetrakis(3,5-bis(trifluoromethyl)phenyl)borate, and dialkyl ammonium salts such as:

di-(iso-propyl)ammonium tetrakis(pentafluorophenyl)borate, and dicyclohexylammonium tetrakis(pentafluorophenyl)borate;

and other salts such as:

tri(o-tolyl)phosphonium tetrakis(pentafluorophenyl)borate, tri(2,6-dimethylphenyl)phosphonium tetrakis(pentafluorophenyl)borate, tropillium tetraphenylborate, triphenylcarbenium tetraphenylborate, triphenylphosphonium tetraphenylborate, triethylsilylium tetraphenylborate, benzene (diazonium)tetraphenylborate, tropillium tetrakis (pentafluorophenyl)borate, triphenylcarbenium tetrakis (pentafluorophenyl)borate, triphenylphosphonium tetrakis (pentafluorophenyl)borate, triethylsilylium tetrakis (pentafluorophenyl)borate, benzene(diazonium)tetrakis (pentafluorophenyl)borate, tropillium tetrakis-(2,3,4,6-tetrafluorophenyl)borate, triphenylcarbenium tetrakis-(2,3,4, 6-tetrafluorophenyl)borate, triphenylphosphonium tetrakis-(2,3,4,6-tetrafluorophenyl)borate, triethylsilylium tetrakis-(2,3,4,6-tetrafluorophenyl)borate, benzene(diazonium) tetrakis-(2,3,4,6-tetrafluorophenyl)borate, tropillium tetrakis (perfluoronaphthyl)borate, triphenylcarbenium tetrakis(perfluoronaphthyl)borate, triphenylphosphonium tetrakis(perfluoronaphthyl)borate, triethylsilylium tetrakis(perfluoronaphthyl)borate, benzene(diazonium)tetrakis(perfluoronaphthyl)borate, tropillium tetrakis (perfluorobiphenyl)borate, triphenylcarbenium tetrakis(perfluorobiphenyl)borate, triphenylphosphonium tetrakis(perfluorobiphenyl)borate, triethylsilylium tetrakis(perfluorobiphenyl)borate, benzene(diazonium)tetrakis(perfluorobiphenyl)borate, tropillium tetrakis (3,5-bis(trifluoromethyl)phenyl)borate, triphenylcarbenium tetrakis(3,5-bis(trifluoromethyl)phenyl)borate, triphenylphosphonium tetrakis(3,5-bis(trifluoromethyl)phenyl) borate, triethylsilylium tetrakis(3,5-bis(trifluoromethyl)phenyl)borate, and benzene(diazonium)tetrakis(3,5-bis (trifluoromethyl)phenyl)borate.

Most preferably, the ionic stoichiometric activator (L**—H)$_d^+$ (A$^{d-}$) is N,N-dimethylanilinium tetrakis(perfluorophenyl)borate, N,N-dimethylanilinium tetrakis(perfluoronaphthyl)borate, N,N-dimethylanilinium tetrakis (perfluorobiphenyl)borate, N,N-dimethylanilinium tetrakis (3,5-bis(trifluoromethyl)phenyl)borate, triphenylcarbenium tetrakis(perfluoronaphthyl)borate, triphenylcarbenium tetrakis(perfluorobiphenyl)borate, triphenylcarbenium tetrakis (3,5-bis(trifluoromethyl)phenyl)borate, or triphenylcarbenium tetra(perfluorophenyl)borate.

In addition to the activator and bis(imino)pyridyl complex, the present catalyst system may include a co-catalyst, which is a compound capable of alkylating the transition metal complex, such that when used in combination with an activator, an active catalyst is formed. Suitable co-catalysts include alumoxanes such as methyl alumoxane, modified alumoxanes such as modified methyl alumoxane, and more preferably aluminum alkyls such trimethyl aluminum, tri-isobutyl aluminum, triethyl aluminum, and tri-isopropyl aluminum. The co-catalyst may be contained on the support with the other components of the catalyst system or may be separately added to catalysts system during a polymerization process.

Typically in the catalyst system, the molar ratio of the bis(imino)pyridyl complex to the ionic or neutral stoichiometric activator is from about 1:1 to about 1:2, whereas the molar ratio of bis(imino)pyridyl complex to the aluminum alkyl co-catalyst is from about 1:4 to about 1:10.

Supported Catalyst

In the present catalyst composition, the bis(imino)pyridyl complex, and optionally also the activator, is placed on a support having an aluminum halide and/or an alkylaluminum halide chemically or physically bonded thereto. Conveniently, the alkylaluminum halide is represented the formula $AlX_2R$ or $AlXR_2$ where X is a halide group and R is an alkyl group having from about 1 to about 8 carbon atoms, such as diethylaluminum chloride.

Suitable support materials have surface hydroxyl groups that can react with the aluminum halide and/or an alkylaluminum halide and include inorganic oxides of metals from Groups 2, 3, 4, 5, 13, and 14 of the Periodic Table. These include silica, which may or may not be dehydrated, fumed silica, alumina (see International Patent Publication No. WO 99/60033), silica-alumina, and mixtures thereof. Other useful supports include magnesia, titania, zirconia, magnesium chloride (see U.S. Pat. No. 5,965,477), montmorillonite (see European Patent No. 0 511 665 B1), phyllosilicate, zeolites, talc, clays (see U.S. Pat. No. 6,034,187), and the like. Also, combinations of these support materials may be used, for example, silica-chromium, silica-alumina, and silica-titania. Typical supports comprise silica and alumina.

Conveniently, the support material is a porous particulate material having a surface area in the range of from about 10 to about 700 m$^2$/g, a pore volume in the range of from about 0.1 to about 4.0 cc/g, and an average particle size in the range of from about 5 to about 500 μm. More typically, the surface area of the support material is in the range of from about 50 to about 500 m$^2$/g, the pore volume is in the range of from about 0.5 to about 3.5 cc/g, and the average particle size is in the range of from about 10 to about 200 μm. In one embodiment, the surface area of the support material is in the range of from about 100 to about 400 m$^2$/g, the pore volume is in the range from about 0.8 to about 3.0 cc/g, and the average particle size is in the range from about 5 to about 100 μm. The average pore size of the support material useful in the invention is typically in the range of from 10 to 1000 Å, such as in the range of from about 50 to about 500 Å, for example in the range of from about 75 to about 350 Å.

The supported catalyst is produced by initially treating the support material with an aluminum halide or an alkylaluminum halide, typically at a temperature between about 20° C. and about 50° C. for a time of about 1 to about 12 hours, to produce an aluminum-treated support. The aluminum-treated support is generally then reacted with the bis(imino)pyridyl complex, typically at a temperature between about 20° C. and about 50° C. for a time of about 10 min to about 8 hours. Thereafter the catalyst-containing, aluminum-treated support is reacted with the activator, typically at a temperature between about 20° C. and about 50° C. for a time of about 10 ml to about 24 hours, to produce the supported catalyst system. If desired, one or each reaction step may be conducted in an organic solvent inert to the reagents, such as toluene.

Alternatively, the aluminum-treated support can be reacted with the activator prior to, or at the same time as, the reaction with the bis(imino)pyridyl complex. However, improved results, and in particular, polymers with narrower molecular weight distribution, are generally produced when the catalyst system is produced by reacting the aluminum-treated support with the bis(imino)pyridyl complex prior to reaction with the activator.

Polymerization Processes

The present catalyst system is useful in polymerizing unsaturated monomers conventionally known to undergo metallocene-catalyzed polymerization such as solution, slurry, gas-phase, and high-pressure polymerization. Typically one or more transition metal compounds, one or more activators and/or co-catalysts, and one or more monomers are contacted in one or more reactors in series or in parallel to produce polymer. The supported transition metal compound, activator and when present, co-catalyst, may be delivered as a solution or slurry, either separately to the reactor, activated in-line just prior to the reactor, or preactivated and pumped as an activated solution or slurry to the reactor. Polymerizations are carried out in either single reactor operation, in which monomer, comonomers, catalyst/activator/co-catalyst, optional scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. In one preferred embodiment, the precatalyst is activated in the reactor in the presence of olefin.

Suitable monomers for polymerization using the present catalyst system include monomers having from 2 to 30 carbon atoms, such as from 2 to 12 carbon atoms, and for example from 2 to 8 carbon atoms. In one embodiment, the catalyst system described herein is used in the homopolymerization of ethylene or the copolymerization of ethylene with at least one alpha-olefin comonomer having from 3 to 8 carbon atoms, preferably 4 to 8 carbon atoms. Particularly useful comonomers are propylene, 1-butene, 4-methyl-1-pentene, 3-methyl-1-pentene, 1-hexene, and 1-octene.

This invention further relates to:

1. A catalyst system for the polymerization or copolymerization of 1-olefins, the catalyst system comprising a bis(imino) pyridyl complex of a transition metal on a support having an aluminum halide and/or an alkylaluminum halide chemically or physically bonded thereto.

2. The catalyst system of paragraph 1, wherein the support has surface hydroxyl groups which have been chemically reacted with said aluminum halide and/or alkylaluminum.

3. The catalyst system of paragraph 1 or 2, wherein the support comprises silica or alumina.

4. The catalyst system of paragraph 1, 2 or 3, wherein the support has an alkylaluminum halide chemically or physically bonded thereto.

5. The catalyst system of paragraph 1, 2, 3 or 4, wherein the alkylaluminum halide has the formula $AlX_2R$ or $AlXR_2$ where X is a halide group and R is an alkyl group having from 1 to 8 carbon atoms.

6. The catalyst system of any of paragraphs 1 to 5, wherein the alkylaluminum halide comprises diethylaluminum chloride.

7. The catalyst system of any of paragraphs 1 to 6, wherein the transition metal comprises iron.

8. The catalyst system of any of paragraphs 1 to 7, wherein the bis(imino)pyridyl complex is represented by the formula:

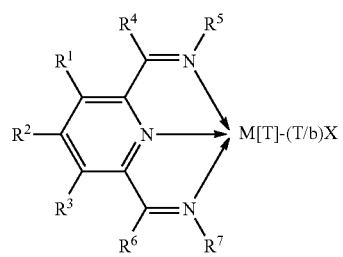

wherein M comprises a transition metal from Group 7, 8 or 9 of the Periodic Table of Elements; X is an atom or group covalently or ionically bonded to the transition metal M; T is the oxidation state of the transition metal M and b is the valency of the atom or group X; and $R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more can be linked to form one or more cyclic substituents.

9. The catalyst system of paragraph 8, wherein the transition metal M is selected from the group consisting of Fe[II] Fe[III], Co[I], Co[II], Co[III], Mn[I], Mn[II], Mn[III], Mn[IV], Ru[II], Ru[III] and Ru[IV].

10. The catalyst system of any of paragraphs 1 to 7, wherein the bis(imino)pyridyl complex is represented by the formula:

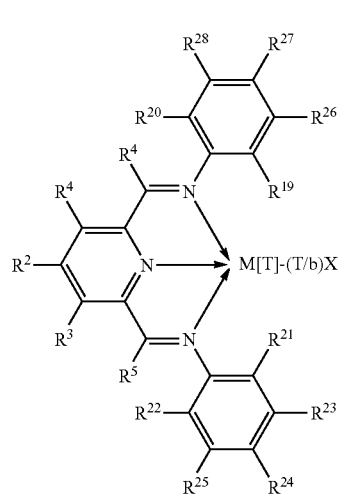

wherein M comprises a transition metal from Group 7, 8, or 9 of the Periodic Table of Elements; X represents an atom or group bonded to the transition metal M; T is the oxidation state of the transition metal M and b is the valency of the atom or group X; $R^1$, $R^2$, $R^3$, $R^4$, $R^5$, $R^{19}$, $R^{20}$, $R^{21}$, $R^{22}$, $R^{23}$, $R^{24}$, $R^{25}$, $R^{26}$, $R^{27}$ and $R^{28}$ are independently selected from the group consisting of hydrogen, halogens, hydrocarbyls and substituted hydrocarbyls, provided that when any two or more of $R^1$, $R^2$, $R^3$, $R^4$, and $R^5$ are hydrocarbyl or substituted hydrocarbyl, two or more can be linked to form one or more cyclic substituents.

11. The catalyst system of paragraph 10, wherein the transition metal M is selected from Fe[II] Fe[III], Co[I], Co[II], Co[III], Mn[I], Mn[II], Mn[III], Mn[IV], Ru[II], Ru[III] and Ru[IV].

12. The catalyst system of paragraph 10, or 11 wherein M comprises Fe[II].

13. The catalyst system of paragraph 10, 11, or 12, wherein X comprises a halide.

14. The catalyst system of paragraph 10, 11, 12, or 13, wherein X comprises chloride.

15. The catalyst system of any of paragraphs 10 to 14, wherein $R^1$, $R^2$, $R^3$, $R^{23}$, $R^{24}$, $R^{25}$, $R^{26}$, $R^{27}$ and $R^{28}$ are hydrogen, $R^4$ and $R^5$ are alkyl, and $R^{19}$, $R^{20}$, $R^{21}$ and $R^{22}$ are independently selected from hydrogen, alkyl, and aryl.

16. The catalyst system of any of paragraphs 10 to 15, wherein $R^4$ and $R^5$ are methyl, and $R^{19}$, $R^{20}$, $R^{21}$ and $R^{22}$ are independently selected from hydrogen, methyl, and tolyl.

17. The catalyst system of any of paragraphs 1 to 16, and further including a neutral or ionic activator.

18. The catalyst system of paragraph 17, wherein the activator comprises a perfluorinated aryl borate.

19. The catalyst system of any of paragraphs 1 to 18, and further including a trialkylaluminum co-catalyst.

20. The catalyst system of paragraph 19, wherein the co-catalyst comprises triisobutylaluminum.

21. A method of producing a catalyst system (preferably any of the above catalyst systems of paragraphs 1 to 20) for the polymerization or copolymerization of olefins, the method comprising:
(a) treating a support with an aluminum halide or an alkylaluminum halide to produce an aluminum-treated support;
(b) reacting the aluminum-treated support with a bis(imino)pyridyl complex of a transition metal; and
(c) reacting the aluminum-treated support with a perfluorinatedaryl borate.

22. The method of paragraph 21, wherein the reacting (c) is effected after the reacting (b).

23. The method of paragraph 21, or 22, wherein the reacting (c) is effected before the reacting (b).

24. The method of paragraph 21, 22, or 23, wherein the support is treated with diethylaluminum chloride.

25. The method of any of paragraphs 21 to 25, wherein the perfluorinatedaryl borate comprises a trityl perfluorinated phenyl borate.

26. A process for polymerizing or copolymerizing at least one α-olefin, the process comprising contacting said at least one α-olefin under polymerization conditions with the catalyst systems of paragraphs 1 to 20 or a catalyst system prepared by the method of paragraphs any of 21 to 25.

27. The process of paragraph 26, wherein said at least one 1-olefin comprises ethylene. The catalyst system for the polymerization or copolymerization of α-olefins comprising a bis(imino)pyridyl complex of a transition metal, as described herein, is preferably immobilized on a support, having an aluminum halide and/or an alkylaluminum halide chemically or physically bonded thereto.

The invention will now be more particularly described with reference to the following non-limiting Examples.

In the experiments described below, methylalumoxane, MAO, (30 wt % in toluene) was obtained from Albemarle. Triethylaluminum (25 wt % in toluene), diethylaluminum chloride, and diethylaluminum ethoxide were obtained from Aldrich. Anhydrous toluene was obtained from Aldrich and used as received. $[Ph_3C][B(C_6F_5)_4]$ was obtained from Grace-Davison.

Synthetic procedures were performed in an inert atmosphere dry box following common protocol in obtaining air-sensitive materials.

Molecular weights [number average molecular weight (Mn), and weight average molecular weight (Mw] and molecular weight distributions (PD or Mw/Mn) were determined using a Waters 2000 Gel Permeation Chromatograph (GPC) equipped with a differential refractive index (DRI) detector and calibrated with polystyrene standards. The polymer samples were dissolved in 1,2,4-trichlorobenzene at 140 to 160° C. for 1-3 hrs in a shaker oven. The solution was then filtered through 2 micron stainless steel filter from Polymer Labs into scintillation vials and then analyzed on the Waters 2000 GPC instrument. The column was a Polymers Lab mixed B column with polystyrene/DVB beads and the run temperature was 145° C. The molecular weight data are reported in g/mol, unless otherwise noted.

EXPERIMENTAL

Synthesis of Bis(imino)pyridyl Complexes 2,6 Bis[1-(2,6-dimethylphenylimine)ethyl]pyridine iron dichloride of formula (III):

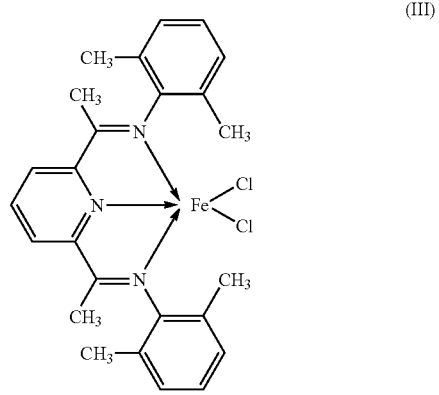

(III)

was synthesized as described in *Chem. Comm.*, 1998, p 849.

2,6 bis[1-(2-tolylphenylimine)ethyl]pyridine iron dichloride of formula (IV):

(IV)

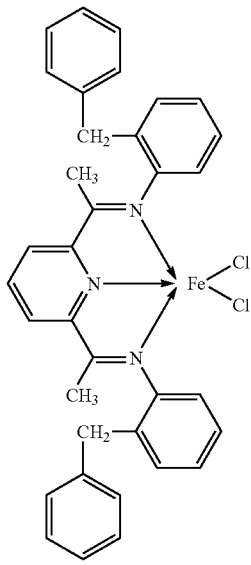

was synthesized by the methods reported in *J. Orgmet. Chem.*, (2002), 648, p. 55.

Experimental

Synthesis of Silica Supports

A series of aluminum treated silica supports were produced as follows.

(a) SMAO-757

Ineous ES-757 silica gel, 40 g (calcined at 600° C.) was slurried in 125 ml toluene and reacted with 47 g MAO (Albemarle, 30 wt % in toluene) at room temperature for 2 hrs. The SMAO was then filtered over a glass frit and washed with hexane to facilitate drying in vacuo 1 to 2 hours until a free flowing support was obtained. A yield of 53.5 g of dry SMAO-757 was obtained.

(b) TEAL-757

Ineous ES-757 silca gel, 20 g (calcined at 600° C.) was slurried in 100 ml of toluene and reacted with 38 g triethylaluminum (25 wt % in toluene). The mixture was stirred for 12 hours at ambient temperature. Solid was collected on a glass frit, washed with hexane and dried in vacuo. Teal-757 was obtained as a white free-flowing solid (21.8 g).

(c) DEAC-757

Ineous ES-757 silca gel, 11.5 g (calcined at 600° C.) was slurried in 30 ml of toluene and reacted with 5 g diethylaluminum chloride for 4 hrs. The resulting solid was collected on a glass frit, washed with hexane and dried in vacuo. DEAC-757 was obtained as a white free-flowing solid (12.6 g).

(d) DEAlOEt-757

Ineous ES-757 silca gel, 10.5 g (calcined at 600° C.) was slurried in 40 ml of toluene and reacted with 6 g diethylaluminum ethoxide for 4 hrs. The resulting solid was collected on a glass frit, washed with hexane and dried in vacuo. DEAlOEt-757 was obtained as a white free-flowing solid (11.5 g).

Catalyst Synthesis Example 1

DEAC-757 (45 g) was slurried in 300 mls of toluene and reacted with [$Ph_3C$][$B(C_6F_5)_4$] (6 g) for 10 min at ambient temperature. Fe compound III (3 g) was added and the reaction mixture stirred for 12 hr. The resulting solid was filtered and washed with hexane and dried in vacuo. The catalyst was yellow-orange in color.

Catalyst Synthesis Example 2

DEAC-757 (2.0 g) was slurried in 30 mls of toluene and reacted with 2,6 bis[1-(2-tolylphenylimine)ethyl]pyridine iron dichloride (0.2 g) for 10 min at ambient temperature. [$Ph_3C$][$B(C_6F_5)_4$] (0.3 g) was then added and the mixture was stirred for 20 min. The supported catalyst was filtered, washed with hexane and dried in vacuo to yield a bright orange solid.

Catalyst Synthesis Example A (Comparative)

2,6 Bis[1-(2,6-dimethylphenylimine)ethyl]pyridine iron dichloride (36 mg) was slurried in 30 ml toluene. 2 g of SMAO-757 was added and the mixture stirred for 2 hr. The catalyst was filtered, washed with hexane and dried in vacuo for 4 hr. A tan colored free flowing solid was obtained.

Catalyst Synthesis Example B (Comparative)

2,6 Bis[1-(2,6-dimethylphenylimine)ethyl]pyridine iron dichloride (36 mg) was slurried in 30 ml toluene. TEAL-757 (2.0 g) was added and the mixture stirred for 2 hr. The catalyst was filtered, washed with hexane and dried in vacuo for 4 hr. A light green solid was obtained.

Catalyst Synthesis Example C (Comparative)

2,6 Bis[1-(2,6-dimethylphenylimine)ethyl]pyridine iron dichloride (36 mg) and [$Ph_3C$][$B(C_6F_5)_4$] (71 mg) were reacted together in 30 ml toluene for 30 minutes. TEAL-757 (2.0 g) was added and the mixture stirred for 2 hr. The catalyst was filtered, washed with hexane and dried in vacuo for 5 hr. A tan solid was obtained.

Catalyst Synthesis Example D (Comparative)

DEAC-757 (1.1 g) was slurried in 30 ml toluene. 2,6 Bis[1-(2,6-dimethylphenylimine)ethyl]pyridine iron dichloride (61 mg) was added and the mixture stirred for 2 hr. The catalyst was filtered, washed with hexane and dried in $N_2$ atmosphere overnight. A light orange solid was obtained.

Catalyst Synthesis Example E (Comparative)

DEAlOEt-757 (1.1 g) was slurried in 30 ml toluene. 2,6 Bis[1-(2,6-dimethylphenylimine)ethyl]pyridine iron dichloride (59 mg) was added and the mixture stirred for 12 hrs. The blue catalyst was then heated to 90° C. for 1 hr. The blue solid was filtered, washed with hexane and dried in $N_2$ atmosphere overnight. A blue solid was obtained.

Catalyst Synthesis Example F (Comparative)

DEAlOEt-757 (1.0 g) was slurried in 30 ml toluene. [$Ph_3C$][$B(C_6F_5)_4$] (70 mg) was added and the mixture stirred for 10 min. 2,6 Bis[1-(2,6-dimethylphenylimine)ethyl]pyridine iron dichloride (23 mg) was then added and the mixture stirred for 2 hrs. The solid was filtered, washed with hexane and dried in $N_2$ atmosphere overnight.

Catalyst Synthesis Example G (Comparative)

SMAO-757 (2.0 g) was slurried in 30 ml toluene. 2,6 bis[1-(2-tolylphenylimine)ethyl]pyridine iron dichloride (0.1 g) was added and the reaction mixture stirred for 2 hrs. The solid was filtered, washed with hexane and dried in vacuo to yield a tan colored solid.

Polymerization Example 1

The catalysts produced in Catalyst Synthesis Example 1 and Comparative Examples A to F were employed to polymerize ethylene in isobutene at a pressure of 180 psi (1241 kPa) at a temperature of 70° C. or 80° C. for 30 minutes in the presence of varying amounts of triisobutylaluminum (TIBAL) as a co-catalyst/scavenger. Polymerizations were performed in a 1 L stainless steel autoclave manufactured by Autoclave Engineers. TIBAL was charged into the reactor followed by isobutene (400 mls) under a $N_2$ blanket. The reactor contents were heated to the desired temperature and agitation was set to 850 rpm. Ethylene (200 psi/1379 kPa) was introduced and maintained throughout the polymerization. The catalyst was injected under a small amount of high pressure nitrogen. The reaction was allowed to proceed for 30 min and then the autoclave was cooled and depressurized. The polymer was transferred into a glass vessel and dried in vacuo at 70° C. for 4 hours.

The results are summarized in Table 1 and show that the supported iron complex of Example 1 is effective in producing low weight average molecular weight (less than 50,000 g/mol) polyethylene of relatively narrow molecular weight distribution especially at low polymerization temperatures.

TABLE 1

| Catalyst | TIBAL 25%, ml | T, ° C. | Yield, g | Cat. Activity, g polymer/g cat. | Mw (g/mol) | Mn (g/mol) | Mw/Mn |
| --- | --- | --- | --- | --- | --- | --- | --- |
| A | 0.4 | 80 | 57.06 | 5706.00 | 319254 | 22984 | 13.9 |
| A | 0.4 | 80 | 64.23 | 2141.00 | 244350 | 22877 | 10.7 |
| B | 0.4 | 80 | 27.33 | 911.00 | 295622 | 17417 | 17.0 |
| B | 0.4 | 80 | 30.02 | 750.50 | 220975 | 18363 | 12.0 |
| B | 0.4 | 80 | 24.27 | 606.75 | 266552 | 16108 | 16.6 |
| C | 0.4 | 80 | 6.09 | 203.00 | 86880 | 2522 | 34.0 |
| C | 0.4 | 80 | 13.82 | 276.40 | 178604 | 13419 | 13.3 |
| D | 0.4 | 80 | 11.33 | 161.85 | 145962 | 12488 | 11.7 |
| Example 1 | 0.4 | 70 | 31.15 | 623.00 | 21000 | 6416 | 3.3 |
| Example 1 | 0.4 | 70 | 8.12 | 203.00 | 17620 | 5089 | 3.5 |
| Example 1 | 0.4 | 80 | 15.49 | 154.90 | 32555 | 3474 | 9.0 |
| Example 1 | 0.8 | 80 | 11.78 | 147.25 | 8324 | 2011 | 4.1 |
| E | 0.4 | 80 | 2.92 | 48.66 | 132642 | 16121 | 8.2 |
| E | 0.4 | 80 | 8.80 | 88.00 | 143047 | 9600 | 14.9 |
| F | 0.4 | 80 | 14.77 | 369.25 | 85146 | 4664 | 18.3 |
| F | 0.4 | 80 | 29.04 | 414.85 | 106751 | 5286 | 20.2 |

Polymerization Example 2

The process of Polymerization Example 1 was repeated but using the catalysts produced in Catalyst Synthesis Example 2 and Comparative Example G.

The results are summarized in Table 2 and demonstrate that the catalyst of Catalyst Synthesis Example 2 produces a polyethylene with narrow Mw/Mn in comparison to that produced by the catalyst of Comparative Example G. Wax materials or low Mw materials such as these find use in ink formulations for example, or may be used as macromers in further polymerizations.

TABLE 2

| Catalyst | T, ° C. | Yield, g | Cat. Activity, g polymer/g cat. | Mw (g/mol) | Mn (g/mol) | Mw/Mn |
| --- | --- | --- | --- | --- | --- | --- |
| G | 80 | 82.24 | 1644.80 | 12043 | 592 | 20.3 |
| G | 65 | 57.59 | 1151.80 | 36566 | 1014 | 36.0 |
| Example 2 | 70 | 7.80 | 76.00 | 566 | 258 | 2.2 |

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention. All documents described herein are incorporated by reference herein, including any priority documents and/or testing procedures to the extent they are not inconsistent with this text. The term "comprising" is considered synonymous with the term "including" for purposes of Australian law.

What is claimed is:

1. A catalyst system for the polymerization or copolymerization of 1-olefins, the catalyst system comprising a neutral or ionic activator and a bis(imino)pyridyl complex of a transition metal on a support having an aluminum halide and/or an alkylaluminum halide chemically or physically bonded thereto.

2. The catalyst system of claim 1, wherein the support has surface hydroxyl groups which have been chemically reacted with said aluminum halide and/or alkylaluminum halide.

3. The catalyst system of claim 1, wherein the support comprises silica or alumina.

4. The catalyst system of claim 1, wherein the support has an alkylaluminum halide chemically or physically bonded thereto and the alkylaluminum halide has the formula $AlX_2R$ or $AlXR_2$ where X is a halide group and R is an alkyl group having from 1 to 8 carbon atoms.

5. The catalyst system of claim 1, wherein the transition metal comprises iron.

6. The catalyst system of claim 1, wherein the bis(imino)pyridyl complex is represented by the formula:

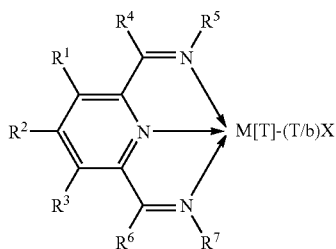

wherein M comprises a transition metal from Group 7, 8 or 9 of the Periodic Table of Elements; X is an atom or group covalently or ionically bonded to the transition metal M; T is the oxidation state of the transition metal M and b is the valency of the atom or group X; and $R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more of $R^1$ to $R^7$ can be linked to form one or more cyclic substituents.

7. The catalyst system of claim 6, wherein the transition metal M is selected from the group consisting of Fe[II] Fe[III], Co[I], Co[II], Co[III], Mn[I], Mn[II], Mn[III], Mn[IV], Ru[II], Ru[III] and Ru[IV].

8. The catalyst system of claim 1, wherein the bis(imino) pyridyl complex is represented by the formula:

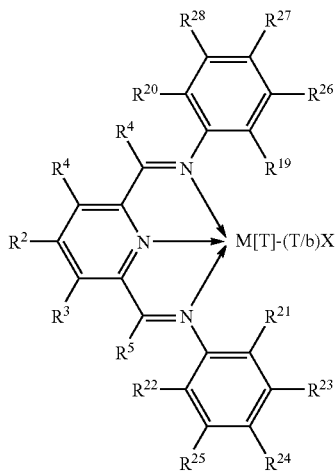

wherein M comprises a transition metal from Group 7, 8 or 9 of the Periodic Table of Elements; X represents an atom or group bonded to the transition metal M; T is the oxidation state of the transition metal M and b is the valency of the atom or group X; $R^1$, $R^2$, $R^3$, $R^4$, $R^5$, $R^{19}$, $R^{20}$, $R^{21}$, $R^{22}$, $R^{23}$, $R^{24}$, $R^{25}$, $R^{26}$, $R^{27}$ and $R^{28}$ are independently selected from the group consisting of hydrogen, halogens, hydrocarbyls and substituted hydrocarbyls, provided that when any two or more of $R^1$, $R^2$, $R^3$, $R^4$, and $R^5$ are hydrocarbyl or substituted hydrocarbyl, two or more can be linked to form one or more cyclic substituents.

9. The catalyst system of claim 8, wherein the transition metal M is selected from Fe[II] Fe[III], Co[I], Co[II], Co[III], Mn[I], Mn[II], Mn[III], Mn[IV], Ru[II], Ru[III] and Ru[IV].

10. The catalyst system of claim 8, wherein M comprises Fe[II].

11. The catalyst system of claim 8, wherein X comprises a halide.

12. The catalyst system of claim 8, wherein $R^1$, $R^2$, $R^3$, $R^{23}$, $R^{24}$, $R^{25}$, $R^{26}$, $R^{27}$ and $R^{28}$ are hydrogen, $R^4$ and $R^5$ are alkyl, and $R^{19}$, $R^{20}$, $R^{21}$ and $R^{22}$ are independently selected from hydrogen, alkyl, and aryl.

13. The catalyst system of claim 12, wherein $R^4$ and $R^5$ are methyl, and $R^{19}$, $R^{20}$, $R^{21}$ and $R^{22}$ are independently selected from hydrogen, methyl, and tolyl.

14. The catalyst system of claim 1, wherein the activator comprises a perfluorinated aryl borate.

15. The catalyst system of claim 1, and further including a trialkylaluminum co-catalyst.

16. The catalyst system of claim 15 wherein the molar ratio of bis(imino)pyridyl complex to the aluminum alkyl co-catalyst is from about 1:4 to about 1:10.

17. The catalyst system of claim 1 wherein the support is silica.

18. The catalyst system of claim 1 wherein the molar ratio of the bis(imino)pyridyl complex to the ionic or neutral stoichiometric activator is from about 1:1 to about 1:2.

19. The catalyst system of claim 1, wherein the support has diethylaluminumchloride chemically or physically bonded thereto.

20. The catalyst system of claim 1 wherein the support material was treated with an aluminum halide or an alkylaluminum halide at a temperature between about 20° C. and about 50° C. to produce the support having an aluminum halide or alkyl aluminum halide chemically or physically bonded thereto.

21. A method of producing a catalyst system for the polymerization or copolymerization of olefins, the method comprising:
(a) treating a support with an aluminum halide or an alkylaluminum halide to produce an aluminum-treated support;
(b) reacting the aluminum-treated support with a bis(imino)pyridyl complex of a transition metal; and
(c) reacting the aluminum-treated support with a perfluorinated aryl borate.

22. The method of claim 21, wherein reacting the aluminum-treated support with a perfluorinated aryl borate is effected after reacting the aluminum-treated support with a bis(imino)pyridyl complex of a transition metal.

23. The method of claim 21, wherein reacting the aluminum-treated support with a perfluorinated aryl borate is effected before reacting the aluminum-treated support with a bis(imino)pyridyl complex of a transition metal.

24. The method of claim 21 wherein the method comprises treating the support material with an aluminum halide or an alkylaluminum halide at a temperature between about 20° C. and about 50° C.

25. The method of claim 21 wherein the method comprises treating the support material with an aluminum halide or an alkylaluminum halide at a temperature between about 20° C. and about 50° C. for a time of about 1 to about 12 hours.

26. A process for polymerizing or copolymerizing at least one α-olefin, the process comprising contacting said at least one α-olefin under polymerization conditions with a catalyst system comprising (a) a bis(imino)pyridyl complex of a transition metal on a support having an aluminum halide and/or an alkylaluminum halide chemically or physically bonded thereto and (b) a neutral or ionic activator.

27. The process of claim 26, wherein the activator comprises a perfluorinated aryl borate.

28. The process of claim 26, wherein the bis(imino)pyridyl complex is represented by the formula:

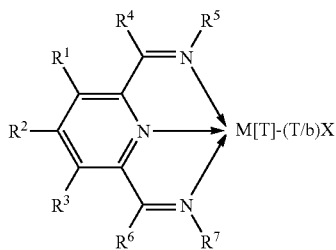

wherein M comprises a transition metal from Group 7, 8 or 9 of the Periodic Table of Elements; X is an atom or group covalently or ionically bonded to the transition metal M; T is the oxidation state of the transition metal M and b is the valency of the atom or group X; and $R^1$ to $R^7$ are independently selected from the group consisting of hydrogen, halogens, hydrocarbyls, and substituted hydrocarbyls, provided that when any two or more of $R^1$ to $R^7$ are hydrocarbyl or substituted hydrocarbyl, two or more can be linked to form one or more cyclic substituents.

29. The process of claim 26, wherein the bis(imino)pyridyl complex is represented by the formula:

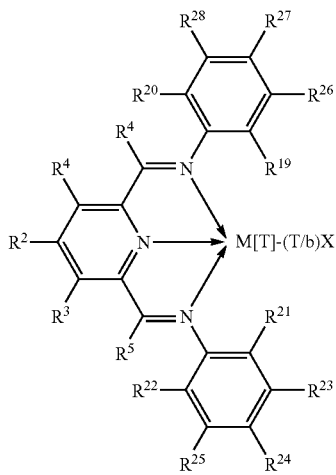

wherein M comprises a transition metal from Group 7, 8 or 9 of the Periodic Table of Elements; X represents an atom or group bonded to the transition metal M; T is the oxidation state of the transition metal M and b is the valency of the atom or group X; $R^1$, $R^2$, $R^3$, $R^4$, $R^5$, $R^{19}$, $R^{20}$, $R^{21}$, $R^{22}$, $R^{23}$, $R^{24}$, $R^{25}$, $R^{26}$, $R^{27}$ and $R^{28}$ are independently selected from the group consisting of hydrogen, halogens, hydrocarbyls, and substituted hydrocarbyls, provided that when any two or more of $R^1$, $R^2$, $R^3$, $R^4$, and $R^5$ are hydrocarbyl or substituted hydrocarbyl, two or more can be linked to form one or more cyclic substituents.

30. The process of claim 26, wherein the catalyst system further includes a trialkylaluminum co-catalyst.

31. The process of claim 30 wherein the molar ratio of bis(imino)pyridyl complex to the aluminum alkyl co-catalyst is from about 1:4 to about 1:10.

32. The process of claim 26, wherein said at least one 1-olefin comprises ethylene.

33. The process of claim 26 wherein the support is silica.

34. The process of claim 26 wherein the molar ratio of the bis(imino)pyridyl complex to the ionic or neutral stoichiometric activator is from about 1:1 to about 1:2.

35. The process of claim 26, wherein the support has surface hydroxyl groups which have been chemically reacted with said aluminum halide and/or alkylaluminum halide.

36. The process of claim 26, wherein the support comprises silica or alumina.

37. The process of claim 26, wherein the support has an alkylaluminum halide chemically or physically bonded thereto and the alkylaluminum halide has the formula $AlX_2R$ or $AlXR_2$ where X is a halide group and R is an alkyl group having from 1 to 8 carbon atoms.

38. The process of claim 26, wherein the transition metal comprises iron.

39. The process of claim 26, wherein the support has diethylaluminumchloride chemically or physically bonded thereto.

40. The process of claim 26 wherein the support material was treated with an aluminum halide or an alkylaluminum halide at a temperature between about 20° C. and about 50° C. to produce the support having an aluminum halide or alkyl aluminum halide chemically or physically bonded thereto.

41. The process of claim 26 wherein the process is a solution process.

42. The process of claim 26 wherein the process is a slurry process.

* * * * *